United States Patent
Chu et al.

(10) Patent No.: US 10,572,836 B2
(45) Date of Patent: Feb. 25, 2020

(54) AUTOMATIC TIME INTERVAL METADATA DETERMINATION FOR BUSINESS INTELLIGENCE AND PREDICTIVE ANALYTICS

(71) Applicant: International Business Machines Corporation, Armonk, NY (US)

(72) Inventors: Yea Jane Chu, Chicago, IL (US); Weicai Zhong, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 14/884,468

(22) Filed: Oct. 15, 2015

(65) Prior Publication Data

US 2017/0109678 A1  Apr. 20, 2017

(51) Int. Cl.
*G06Q 10/00* (2012.01)
*G06Q 10/06* (2012.01)
*G06F 16/28* (2019.01)

(52) U.S. Cl.
CPC ......... *G06Q 10/063* (2013.01); *G06Q 10/067* (2013.01); *G06Q 10/06393* (2013.01); *G06F 16/283* (2019.01)

(58) Field of Classification Search
CPC ............ G06F 17/30592; G06Q 10/063; G06Q 10/067; G06Q 10/04; G06Q 10/0202; G06Q 10/06393
See application file for complete search history.

(56) References Cited

U.S. PATENT DOCUMENTS 7,711,734 B2  5/2010  Leonard
7,716,022 B1 *  5/2010  Park ...................... G06Q 10/10
702/181

(Continued)

FOREIGN PATENT DOCUMENTS

EP    1265173 A1   12/2002
EP    2284769 A1    2/2011
WO  2013051101 A1   4/2013

OTHER PUBLICATIONS

Ma, S., & Hellerstein, J. (2002). Mining partially periodic event patterns with unknown periods. Proceedings 17th International Conference on Data Engineering, 205-214. (Year: 2002).*

(Continued)

*Primary Examiner* — William S Brockington, III
(74) *Attorney, Agent, or Firm* — Richard A. Wilhelm

(57) ABSTRACT

Techniques are described for automatic interval metadata determination for intermittent time series data. In one example, a method for determining intermittent time series interval metadata includes detecting one or more time variables in a time series data set. The method further includes determining whether the one or more time variables are intermittently regular. The method further includes determining one or more respective time intervals for the one or more time variables. The method further includes determining the parameters of intermittency for the one or more time variables. The method further includes generating an output comprising information about the one or more time variables based on the one or more respective time intervals and the parameters of intermittency for the time variable.

19 Claims, 11 Drawing Sheets

(56) References Cited

U.S. PATENT DOCUMENTS

| | | | | |
|---|---|---|---|---|
| 2002/0010663 A1* | 1/2002 | Muller | ............... | G06Q 40/00 |
| | | | | 705/30 |
| 2004/0220771 A1* | 11/2004 | Breiman | ............ | G06Q 10/06 |
| | | | | 702/181 |
| 2005/0246161 A1 | 11/2005 | Sakurai | | |
| 2006/0010101 A1 | 1/2006 | Suzuki et al. | | |
| 2006/0010142 A1 | 1/2006 | Kim et al. | | |
| 2010/0287029 A1* | 11/2010 | Dodge | ............... | G06Q 30/02 |
| | | | | 705/7.31 |
| 2012/0191642 A1 | 7/2012 | George | | |
| 2013/0041644 A1* | 2/2013 | Cremonesi | ......... | G06Q 10/06 |
| | | | | 703/13 |
| 2013/0205192 A1 | 8/2013 | Spada | | |
| 2014/0019909 A1* | 1/2014 | Leonard | ............ | G06F 17/18 |
| | | | | 715/804 |
| 2014/0032506 A1 | 1/2014 | Hoey et al. | | |
| 2014/0222744 A1 | 8/2014 | Maag | | |
| 2014/0229233 A1 | 8/2014 | Hu | | |
| 2016/0108428 A1 | 4/2016 | Baum et al. | | |
| 2017/0017903 A1 | 1/2017 | Gray | | |
| 2017/0132313 A1 | 5/2017 | Kukla | | |
| 2018/0036715 A1 | 2/2018 | Kanazawa | | |

OTHER PUBLICATIONS

Elfeky, M. G., Aref, W. G., & Elmagarmid, A. K. (2005). Periodicity Detection in Time Series Databases. IEEE Transactions on Knowledge and Data Engineering, 17(7), 875-887. (Year: 2005).*

"Time Intervals Node," IBM, Chapter 4: Field Operations Node, accessed on May 26, 2015, pp. 137-147.

"The EXPAND Procedure," SAS Guide, Chapter 14, Getting Started: EXPAND Procedure, accessed on May 26, 2015, pp. 764-816.

Srinivasan, "Significant Interval and Episode Discovery in Time-Series Data," Dec. 2003, 134 pp.

Anonymous, "Automatic Categorization of IT Infrastructure Service Management Data using Natural Language Processing and Machine Learning," ip.com, IPCOM000245200D, Feb. 18, 2016, 7 pp.

Anonymous, "Method and System for Hierarchical, Multimodal, Real Time Decision Support," ip.com, IPCOM000196694D, Jun. 11, 2010, 3 pp.

Mell et al., "The NIST Definition of Cloud Computing," National Institute of Standards and Technology, Information Technology Laboratory, Sep. 2011, 7 pp.

"List of IBM Patents or Patent Applications Treated as Related," Appendix P, Oct. 25, 2016, 2 pp.

Office Action from U.S. Appl. No. 15/459,568, dated Sep. 18, 2018, 15 pp.

Amendment in Response to Office Action dated Sep. 18, 2018, from U.S. Appl. No. 15/459,568, filed Dec. 18, 2018, 13 pp.

Final Office Action from U.S. Appl. No. 15/459,568, dated Feb. 12, 2019, 14 pp.

Response to Final Office Action dated Feb. 12, 2019 from U.S. Appl. No. 15/459,568, filed May 10, 2019, 9 pp.

Office Action from U.S. Appl. No. 15/459,568, dated Jun. 3, 2019, 12 pp.

* cited by examiner

US 10,572,836 B2

AUTOMATIC TIME INTERVAL METADATA DETERMINATION FOR BUSINESS INTELLIGENCE AND PREDICTIVE ANALYTICS

TECHNICAL FIELD

This disclosure relates to business intelligence systems, and more particularly, to business intelligence analytics and predictive analytics systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may include analytics systems that may provide insights into collections of enterprise data. An analytics system may be used to explore data, determine cause and effect relationships among data, formulate predictions based on existing data, and support decision-making, for example. Analytics systems may also include predictive analytics systems, which may be used together with or as part of a BI analytics system. An analytics system may include a variety of tools and capabilities for analyzing and exploring regular time series data.

SUMMARY

In one aspect of the invention, a method for automatic interval metadata determination for intermittent time series data includes detecting, with one or more processing devices, one or more time variables in a time series data set. The method further includes determining, with the one or more processing devices, whether the one or more time variables are intermittently regular. The method further includes determining, with the one or more processing devices, one or more respective time intervals for the one or more time variables. The method further includes determining, with the one or more processing devices, parameters of intermittency for the one or more time variables. The method further includes generating, with the one or more processing devices, an output comprising information about the one or more time variables based on the respective one or more time intervals and the parameters of intermittency for the one or more time variables.

In another aspect, a computer program product for automatic interval metadata determination for intermittent time series data includes a computer-readable storage medium having program code embodied therewith. The program code is executable by a computing device to detect one or more time variables in a time series data set. The program code is further executable by a computing device to determine whether the one or more time variables are intermittently regular. The program code is further executable by a computing device to determine one or more respective time intervals for the one or more time variables. The program code is further executable by a computing device to determine parameters of intermittency for the one or more time variables. The program code is further executable by a computing device to generate an output comprising information about the one or more time variables based on the one or more respective time intervals and the parameters of intermittency for the one or more time variables.

In another aspect, a computer system for automatic interval metadata determination for intermittent time series data includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to detect one or more time variables in a time series data set. The computer system further includes program instructions, stored on at least one of the one or more storage devices for execution by at least one of the one or more processors via at least one of the one or more memories, to determine whether the one or more time variables are intermittently regular. The computer system further includes program instructions, stored on at least one of the one or more storage devices for execution by at least one of the one or more processors via at least one of the one or more memories, to determine one or more respective time intervals for the one or more time variables. The computer system further includes program instructions, stored on at least one of the one or more storage devices for execution by at least one of the one or more processors via at least one of the one or more memories, to determine parameters of intermittency for the one or more time variables. The computer system further includes program instructions, stored on at least one of the one or more storage devices for execution by at least one of the one or more processors via at least one of the one or more memories, to generate an output comprising information about the one or more time variables based on the one or more respective time intervals and the parameters of intermittency for the one or more time variables.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for automated determination of metadata describing time intervals for intermittent time series data. In various examples of this disclosure, a system may automatically enable intermittent time series data to be available for analytical and exploration techniques that may otherwise only be operable only on regular time series data. Implementations of this disclosure may thus enable a wide variety of powerful analytical and exploration techniques to be useable on a wider range of useful data applications.

Figure 1:
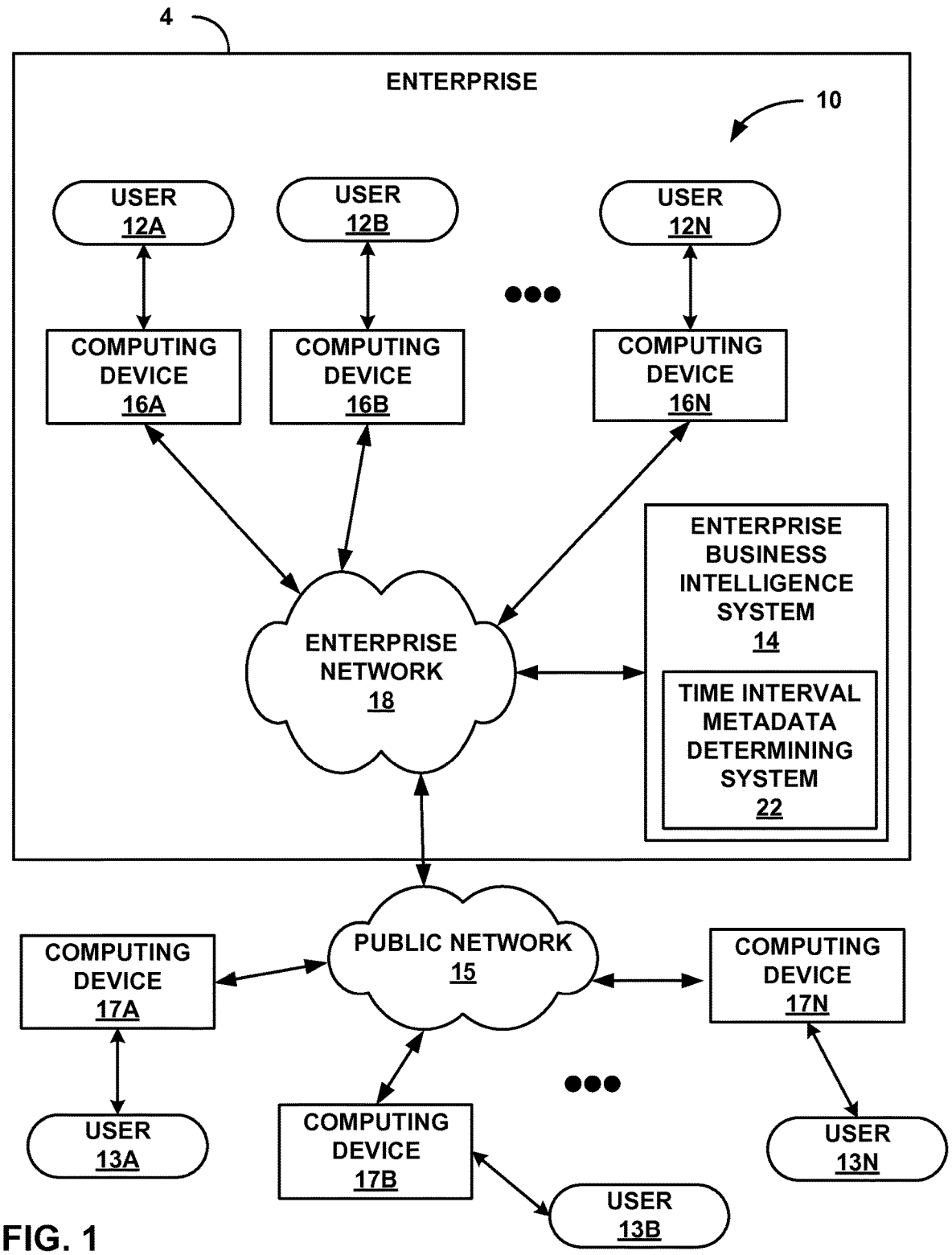
FIG. 1 shows a block diagram illustrating an example enterprise software system that may perform automated determination of metadata defining time intervals of intermittency of time series data, in one aspect of this disclosure.

FIG. 1 shows a block diagram illustrating an example enterprise software system that may perform automated determination of metadata defining time intervals of intermittency of time series data, in one aspect of this disclosure. FIG. 1 illustrates an example context in which a time interval metadata determining system 22 of this disclosure may be used. FIG. 1 is a block diagram illustrating an example enterprise 4 having a computing environment 10 in which a plurality of users 12A-12N within enterprise 4 (collectively, "enterprise users 12" or "users 12") may interact with an enterprise business intelligence (BI) system 14 that includes a time interval metadata determining system 22, as described further below. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15, including external client computing devices 17A-17N (collectively, "external client computing devices 17" or "computing devices 17") used by external users 13A-13N ("external users 13"). Enterprise 4 may thus make time interval metadata determining system 22 available to any of users 12 or external users 13.

Users 12, 13 may use a variety of different types of computing devices 16, 17 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14. An external user 13 may also access time interval metadata determining system 22 via a smartphone, tablet computer, or similar device, running a business intelligence dashboard in a web browser, a dedicated mobile application, or other means for interacting with certain externally surfaced functions of enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
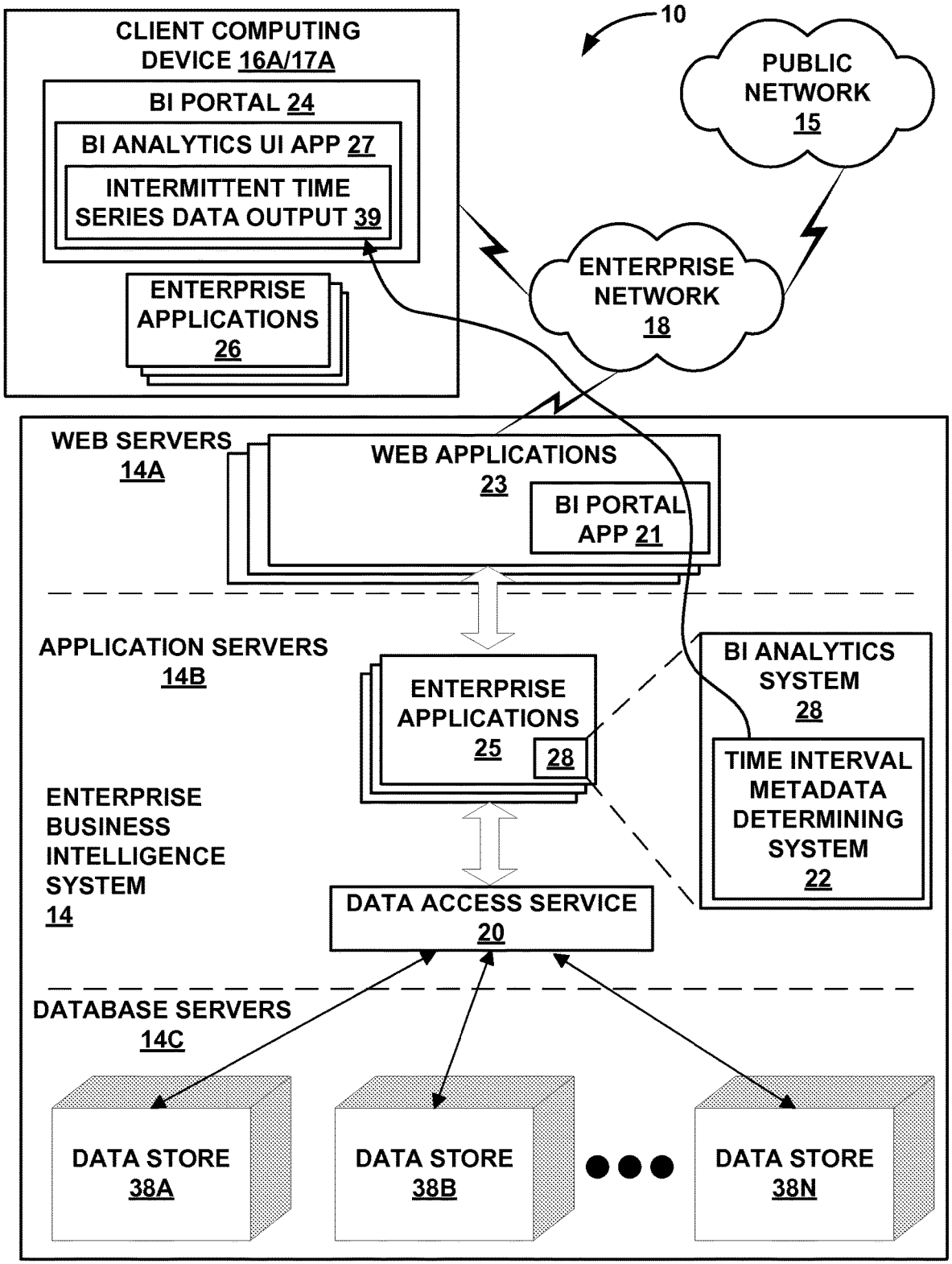
FIG. 2 shows a conceptual block diagram illustrating in further detail portions of one embodiment of enterprise business intelligence (BI) computing environment that includes a BI analytics system and/or a predictive analytics including a time interval metadata determining system as part of an enterprise BI computing system, in one aspect of this disclosure.

FIG. 2 shows a conceptual block diagram illustrating in further detail portions of one embodiment of enterprise business intelligence (BI) computing environment 10 that includes a BI analytics system 28 including time interval metadata determining system 22 as part of an enterprise BI computing system 14, in one aspect of this disclosure. Time interval metadata determining system 22 may be part of a predictive analytics system included in BI analytics system 28. In this example implementation, a single client computing device 16A is shown for purposes of example and includes a BI portal 24 and one or more client-side enterprise software applications 26 that may utilize and manipulate data, including to view analytics tools and data visualizations with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may include a user interface for a BI analytics application user interface (UI) 27 that may interact with a BI analytics system 28 that comprises time interval metadata determining system 22. BI analytics system 28 configured with time interval metadata determining system 22 may automatically evaluate a data set to determine whether it includes a time series data set that does or does not have interruptions at regular intervals, and automatically generate interval metadata that includes parameters that characterize the interruption intervals in the intermittent time series data, as further described below. Time interval metadata determining system 22 may thereby enable BI analytics system 28 and/or BI analytics application UI 27 to generate intermittent time series data outputs 39, as further described below.

BI portal 24 may also output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of resource, such as a BI report, a software application, a database, a spreadsheet, a data structure, a flat file, Extensible Markup Language ("XML") data, a comma separated values (CSV) file, a data stream, unorganized text or data, or other type of file or resource. BI portal 24 may also provide visualizations of data based on intermittent time series data that is processed with interval metadata automatically generated by time interval metadata determining system 22 to enable intermittent data to be analyzed and explored using tools for analyzing and exploring time series data, for example.

Time interval metadata determining system 22 may be hosted among enterprise applications 25, as in the example depicted in FIG. 2, or may be hosted elsewhere, including on a client computing device 16A/17A (which may be a client computing device 16A internal to enterprise computing environment 10 or a client computing device 17A external to enterprise computing environment 10 in different examples), or distributed among various computing resources in enterprise business intelligence system 14, in some examples. Time interval metadata determining system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include time interval metadata determining system 22 as one of enterprise software applications 25 or as a portion or portions of one or more of enterprise software applications 25.

The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Data sources 38 may also include one or more sets of cross sectional data, for example.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. These may include graphical representations of time series data models enabled by parameters generated by time interval metadata determining system 22 and incorporating intervals defined by time series interval metadata determined by time interval metadata determining system 22.

As described above and further below, time interval metadata determining system 22 may be implemented in one or more computing devices, and may involve one or more applications or other software modules that may be executed on one or more processors. Example embodiments of the present disclosure may illustratively be described in terms of the example of time interval metadata determining system 22 in various examples described below.

Figure 3:
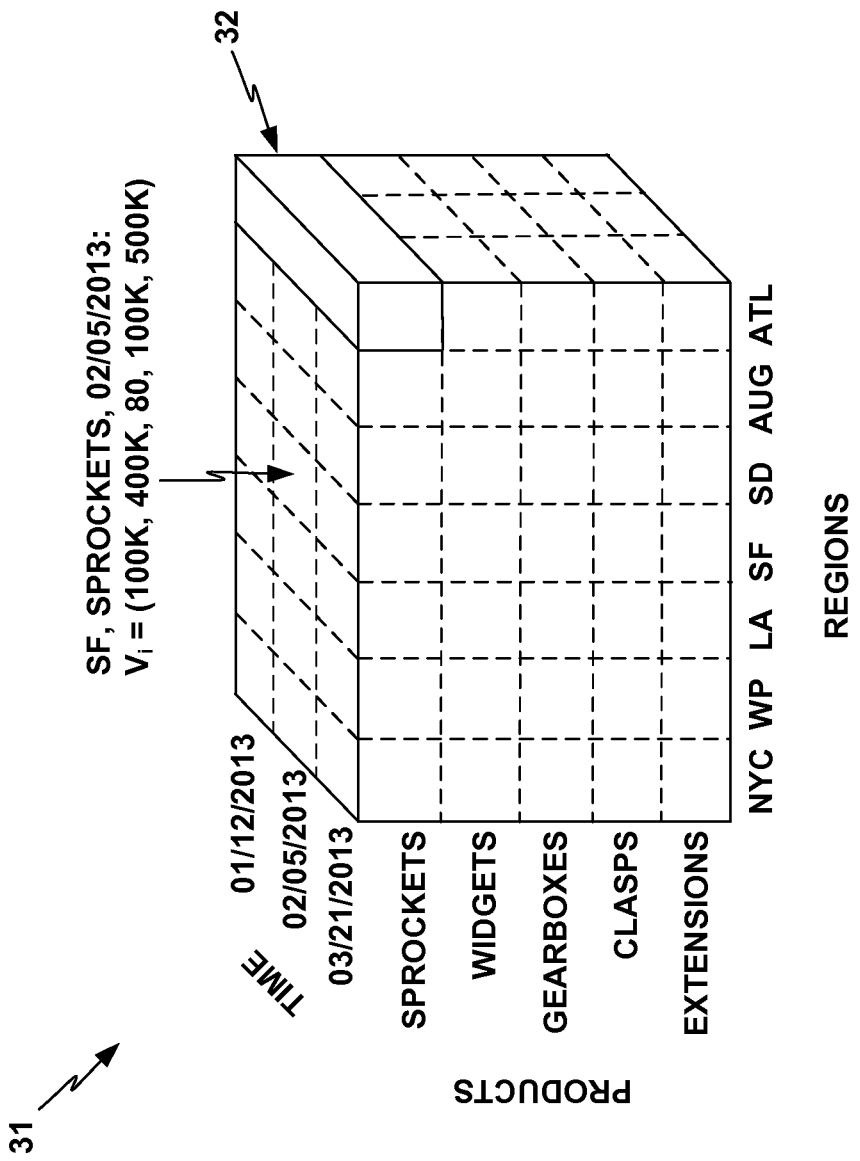
FIG. 3 shows a conceptual diagram of a multidimensional online analytical processing (OLAP) data cube with intermittently regular time series data that may be analyzed and processed by an interval metadata determining system of this disclosure, in one aspect of this disclosure.

FIG. 3 shows a conceptual diagram of a multidimensional online analytical processing (OLAP) data cube 31 with time series data that may be analyzed and processed by time interval metadata determining system 22 of this disclosure, in one aspect of this disclosure. Time series data refers to a set of measured values on a set of time points arranged in time order and described by a time variable. Time interval metadata determining system 22 may detect one or more time variables in various examples. A time variable can be classified into two categories, regular or irregular, based on whether the time points are equally spaced in time or not. Data with an irregular time variable, for irregularly spaced points in time, are referred to as time-stamped data or transactional data. However, some time series data may be intermittently regular with regular interruptions in time; because they are not completely regular, they may be classified as irregular time series, even though they include substantial portions of intermittently regular time series data content. Time interval metadata determining system 22 may detect and process intermittently regular time series data such as to take advantage of the regular time series aspects of the data.

In practice, a simple form of a time series dataset may include a time variable and some measure fields which indicate time series data. However, if a set of time series data is from a multidimensional database, such as an OLAP data cube (e.g., OLAP data cube 31), then time series are not simply indicated by measure fields. Instead, the time series may be identified by combinations of measures (metric variables) and additional variables called dimension variables. For example, OLAP data cube 31 of FIG. 3 includes three dimensions and five metrics: dimensions of Regions, Products, and Time, and metrics of Sales, Revenue, Customer Satisfaction, Profit, and Inventory. Each dimension has a hierarchy that may have several levels. For example, the Regions dimension may have three levels: country, state and city. The country level may be the root level, and have only one value: US. In the state level, there may be values: CA (California), NY (New York), GA (Georgia) (under US). The city level may be the leaf level, and may have three values under CA: LA (Los Angeles), SF (San Francisco), and SD (San Diego); two values under NY: NYC (New York City) and WP (White Plains); and one value under GA: ATL (Atlanta). OLAP data cube 31 as shown in FIG. 3 is depicted in the leaf level for the Regions dimension. Similarly, the Products dimension may have two levels, with root level defining product category as machine, and a leaf level for specific items, such as sprockets, widgets, etc. The applicable Time dimension in OLAP may have four levels: year, quarter, month, day. When applying time series analysis to OLAP data, time dimension has to be fixed in a specific level, such as the day level, then a collection of level values may become a time series (e.g., 1/1/15, . . . , 10/08/15) for a metric (e.g., Sales) with combination of two level values from the other two dimensions (e.g., ATL and sprockets).

Each cell in OLAP data cube 31 may thus store a 5-value tuple, e.g., the cell $v_i$=(100K, 400K, 80, 100K, 500K) for the city of SF, the item of sprockets, and the date of Feb. 5, 2013. A selection of city and item as ATL and sprockets, respectively, may correspond to the long block 32 indicating five daily time series, one for each metric. With different combinations of the Regions and Products dimensions, there are 35 time series in OLAP data cube 31 as shown in FIG. 3, which includes possible values for Regions and Products dimensions only from the leaf levels of an OLAP data cube. Since each dimension has a tree-like hierarchy with different levels, the number of time series can be formed in an OLAP data cube can be substantial. In some examples, time series data from an OLAP store may include or be transformed into a general data structure referred to as Flattened Multi-Dimensional (FMD) format, as further described below. FMD format may facilitate addressing the complexity of OLAP data in some examples.

Figure 4:
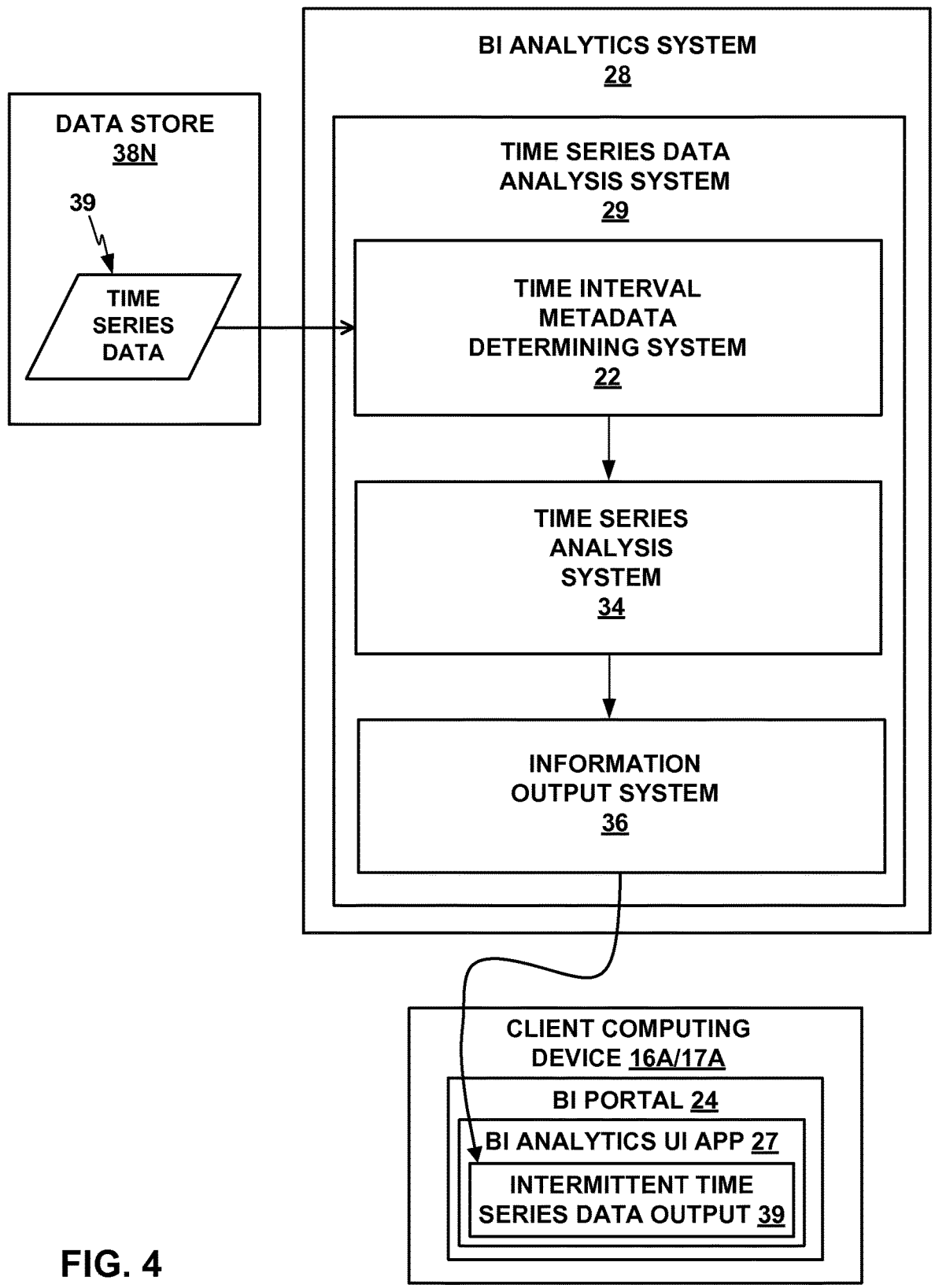
FIG. 4 shows a conceptual block diagram illustrating additional context of a time interval metadata determining system as part of a time series data analysis system included with a BI and predictive analytics system, in one aspect of this disclosure.

FIG. 4 shows a conceptual block diagram illustrating additional context of time interval metadata determining system 22 as part of a time series data analysis system 29 included with BI analytics system 28, in one aspect of this disclosure. Time series data analysis system 29 and time interval metadata determining system 22 may be part of a predictive analytics system included in BI analytics system 28. Time series data analysis system 29 may receive time series data 39 from data store 38N, in this example. Time interval metadata determining system 22 may first analyze and process the time series data, and generate metadata describing the time series data, before passing both the data and the generated metadata describing the data to a time series analysis system 34 and an information output system 36, which may generate and transmit outputs, such as intermittent time series information output 39, to BI analytics UI application 27 executing on client computing device 16A/17A.

Time interval metadata determining system 22 may detect if the time series data set 39 is composed of regular, irregular, or intermittently regular time series data. If time interval metadata determining system 22 detects that time series data set 39 includes intermittently regular time series data, time interval metadata determining system 22 may generate metadata including parameters providing a complete description of the timing of time series data set 39, such as how time series data set 39 differs from a purely regular time series data set, or the timing of intermittent interruptions in time series data set 39. Time interval metadata determining system 22 may thus enable time series analysis system 34 to perform time series modeling algorithms to time series data set 39 including performing regular time series analysis algorithms on the regular time series features of time series data set 39.

In some examples, time series data set 39 may include intermittent time series data in FMD format. Table 1 below shows example data in an FMD data structure, in which "Time" denotes a time variable, "Dimension 1" to "Dimension K" denote K dimension variables, and "Metric 1" to "Metric L" denote L metric variables. One dimension is represented as one column, such that all levels in a hierarchy and their corresponding level values for each level may be listed in the same column. If there is no dimension variable, FMD format collapses to a simple form of a time series dataset, which may be referred to as a "column-based" format.

TABLE 1

Flattened multi-dimensional (FMD) data structure

| Time | Dimension 1 | Dimension ...K | Metric 1 | ... | Metric L |
|---|---|---|---|---|---|
| January 2000 | Division 1 | ... Product A | 5 | ... | 0.34 |
| January 2000 | Division 1 | ... Product B | 10 | ... | 1.22 |
| January 2000 | Division 2 | ... Product A | 6 | ... | 4.55 |
| January 2000 | Division 2 | ... Product B | 15 | ... | 3.26 |
| February 2000 | Division 1 | ... Product B | 11 | ... | 3.12 |
| February 2000 | Division 2 | ... Product A | 33 | ... | 1.22 |

In some examples, time interval metadata determining system 22 may analyze FMD data encoding intermittent time series data, determine and generate metadata describing the time series data, convert the FMD data structure to column-based data structure described by the metadata, and output the column-based time series data and the metadata that describes the time series data and the timing of its intermittencies. In some examples, time interval metadata determining system 22 may: (1) detect one or more time intervals and related parameters for one or more time variables; (2) identify dimension and metric variables; and (3) check whether the number of identified dimension variables is enough to identify all the time series in the dataset. As part of a process of converting data from FMD format, time interval metadata determining system 22 may partition the data into a number of distinct time series defined by dimension variables and metric variables, and make sure each time series is measured on the same set of equally spaced time points. Time interval metadata determining system 22 may determine that a superficially irregular time series of data includes a number of distinct, local portions of data that are each a locally regular time series, and that each have the same regular time interval internally to the local regular time series. In other words, a time-ordered data set may first be interpreted as an irregular, transactional, or time-stamped data set because it lacks a globally regular time interval, yet on closer inspection by time interval metadata determining system 22, the data set may be shown to include local subsets of data that are locally regular time series data at a regular interval within the subset, and with gaps or discontinuities at other interval lengths between the subsets. Time interval metadata determining system 22 may determine the commonly shared regular time interval of the plural time series, and may determine descriptions of the intervals between the various individual time series. Time interval metadata determining system 22 detecting the regular time series time interval accurately enables time interval metadata determining system 22 to provide a processed output that may be subjected to subsequent algorithms or operations suited for regular time series data, such as aggregation, distribution, or modeling, for example.

In some examples of time series data 39, time interval metadata determining system 22 may detect that the time series data is regular, or at purely regular intervals, such as yearly, quarterly, or monthly time series data, for example. In some examples, time interval metadata determining system 22 may detect that the time series data is at intermittently regular intervals, such as daily time series data with interruptions of no data on weekends, or on holidays, weekends, or other days without data in some implementations; or hourly time series data with interruptions of no data at certain hours, such as for a span of time overnight every night, and/or on holidays, weekends, or other days without data.

For example, time series data 39 may include sales data collected hourly for a retail store that has hours of being open for business of 9:00 AM to 9:00 PM on Monday through Saturday, and is closed on Sundays. The hourly sales data series has no data values for 10:00 PM through 9:00 AM for each sequential pair of days from Monday through Saturday (i.e., its first and last daily values are taken at 10:00 AM and 9:00 PM respectively for the first and last hours open for business, respectively). The hourly sales data series also has no data values for 10:00 PM Saturday through 9:00 AM Monday. Time interval metadata determining system 22 may analyze this data and determine four extra timing parameters in addition to the hourly time intervals, including parameters for the beginning of the week ($W_{start}$), the number of days per week ($n_d$), the beginning of the day ($D_{start}$), and the number of hours per day ($n_h$). Time interval metadata determining system 22 may use these four parameters link up the time points of the intermittent regular time series periods (the hourly intra-day sales values, in this example) smoothly and jump over other time points where nothing is measured (overnights and Sundays, in this example). For the example store sales data, the relevant parameters would be detected as $W_{start}$=Monday, $n_d$=6, $D_{start}$=9, and $n_h$=12.

If these extra parameters are not determined and added by time interval metadata determining system 22, then there would exist a large number of time points at the regular interval (on the hour) with missing values that would substantially degrade, and likely render meaningless, subsequent modeling and forecasting processes by time series analysis system 34 attempting to perform algorithms or analyses on time series data. In addition, there may exist other challenges to detect time intervals in time series data correctly, such as that one time point may occur multiple times, such as when the time series data is in FMD format. Time interval metadata determining system 22 may resolve complicating factors of dealing with intermittently regular time series data, including in FMD format, automatically and efficiently, including identification of the intermittently regular time interval and parameters that completely describe the intermittent periods between the regular time series portions, to prepare the data to be correctly handled by subsequent time series modeling and forecasting processes.

Figure 5:
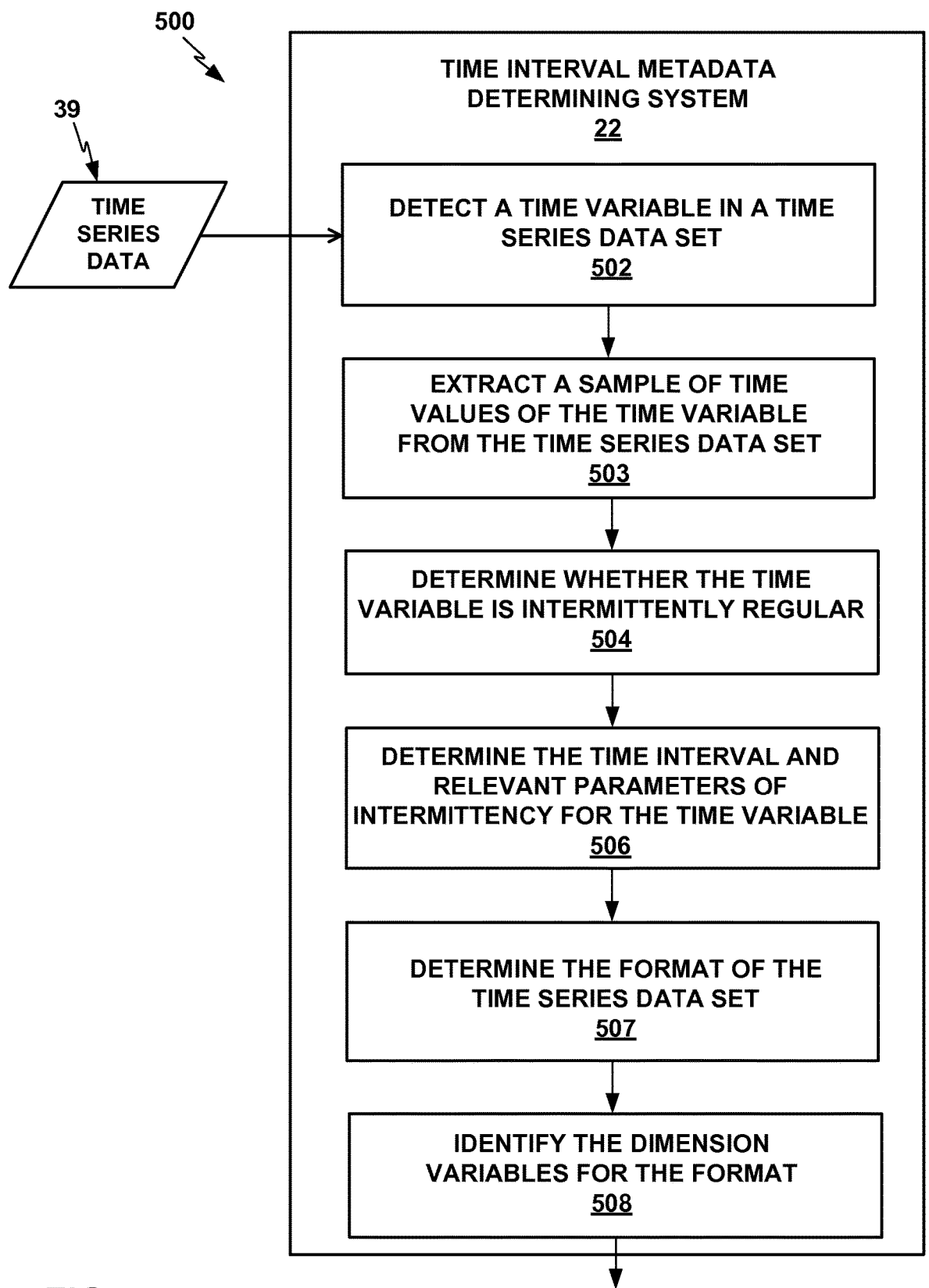
FIG. 5 depicts a flowchart of an example process for automatically determining intermittent time series metadata that a time interval metadata determining system may perform, in one aspect of this disclosure.

FIG. 5 depicts a flowchart of an example process 500 for automatically determining intermittent time series metadata that time interval metadata determining system 22 may perform, in one aspect of this disclosure. Process 500 may include detecting a time variable (potentially one of one or more time variables) in a time series data set (502), determining whether the time variable is intermittently regular (504), and determining the time interval and relevant parameters of intermittency for the time variable (506), without necessarily performing certain other functions depicted in FIG. 5. In some examples, time interval metadata determining system 22 may also perform further functions depicted in FIG. 5. In various examples, time interval metadata determining system 22 may perform process 500 with regard to more than one time variable in a time series data set.

As shown in FIG. 5, some examples of process 500 may include detecting a time variable in a time series data set (502), extracting a sample of time values of the time variable from the time series data set (e.g., if the data set is large) (503), determining whether the time variable is intermittently regular (504), determining the time interval and relevant parameters of intermittency for the time variable (506), determining the format of the time series data set (e.g., determining if the time series data set is in FMD format) (507), and identifying and/or checking the dimension variables for the time series data in the determined format (e.g., FMD format) (508).

Detecting the time variable (502) may include time interval metadata determining system 22 determining the storage type of each variable, and based on the storage types of the variables, selecting variables with time, date, or timestamp types as one or more time variables. If some variable has a data type or metadata or other information indicative of time or date, then time interval metadata determining system 22 may select that variable as a time variable. If time interval metadata determining system 22 detects the presence of multiple time variables, it may determine relevant information for each of one or more time variables; time interval metadata determining system 22 may then also enable a user to select one of the multiple time variables to use.

Time interval metadata determining system 22 may then extract a sample of time values of the time variable from the time series data set (503) when the data set includes a substantially large volume of data. Time interval metadata determining system 22 may extract a relatively small number of distinct time points that provide a representative sample of the time points from the entire data set, that may provide sufficient information to determine the time intervals of the time series.

Time interval metadata determining system 22 may then determine whether the time variable is intermittently regular (504). Time interval metadata determining system 22 may determine that the time points exhibit regular intervals in at least some portions but with missing time points at those regular intervals at at least some other points. Based on the pattern of missing time points, time interval metadata determining system 22 may use a set of rules to determine whether the time points are equally spaced within regular intermittent portions.

Time interval metadata determining system 22 may then determine the time interval and relevant parameters of intermittency for the time variable (506). If the time variable is intermittently regular, time interval metadata determining system 22 may determine the regular time interval and the related parameters describing the pattern of intermittency between the regular time series portions. If the time variable is irregular but with intermittently spaced portions in the time-stamped data, time interval metadata determining system 22 may determine a time interval to aggregate the irregular time points to equally spaced time points, and may calculate parameters describing the pattern of intermittency between the regular time series portions.

Time interval metadata determining system 22 may then determine the format of the time series data set (e.g., determine if the time series data set is in column-based format or other FMD format) (507). Column-based format is a special case of the FMD structure that doesn't have any dimension variables, and instead only has the time variable and one or more metric variables. The column-based format may be simpler to manage than the general FMD structure. Time interval metadata determining system 22 may then identify and/or check the dimension variables for the time series data in the determined format (e.g., the column-based format or general FMD format) (508). If a data set is in the general FMD structure and not the special case of column-based format, time interval metadata determining system 22 may automatically identify the dimension variables based on the measurement level of the variables. In addition, time interval metadata determining system 22 may check whether the number of dimension variables is enough to identify all time series in the data.

Time interval metadata determining system 22 may provide several advantages. For example, time interval metadata determining system 22 may automatically discover metadata of time series data without human intervention; automatically determine whether the time variable of a data set is regular or irregular based on statistical analyses; and automatically detect the time interval and relevant parameters for data sets for both regular and irregular time variables. Additionally, time interval metadata determining system 22 may identify which variables are dimensions, and check whether the number of dimension variables is enough to identify all time series in the data when the data is in the FMD structure.

Extracting a sample of time values of the time variable from the time series data set (503) is described in further detail for some examples as follows. Time interval metadata determining system 22 may first extract n distinct time points from the data in ascending order, where n may have a default value such as n=5000. In other examples, time interval metadata determining system 22 may use any other default value or may use another system or inputted value for the number of extracted time points. In addition, time interval metadata determining system 22 may determine a count ($f_i$) of each time point i, and determine starting and ending times, which may be denoted as $t_{start}$ and $t_{end}$.

When the number of records in the dataset is relatively small and non-distributed, time interval metadata determining system 22 may select the top n time points by sorting time points in ascending order, such as by using the following example method. First, time interval metadata determining system 22 may maintain a list of size n; when a new time point comes, if it exists in the list, its count will be increased by 1; otherwise, it is inserted into the list with the count being set to 1. In addition, time interval metadata determining system 22 may remove the largest time point when the length of the list is greater than n.

When the number of records in a dataset is large and distributed, time interval metadata determining system 22 may use a Map-Reduce method. In this example method, each of a number of mappers may gather a list of the first smallest n distinct time points, including the count of each time point, based on the method described above, then provide the lists to a reducer that may combine all the lists and obtain the first smallest nn distinct time points. Thus, within one data pass, time interval metadata determining system 22 may obtain for the sample the information of the time and frequency values for each index value i for n values of i, as well as the starting and ending time, or: ($t_i$, $f_i$), i∈[1, n], where $t_i<t_{i+1}$; $t_{start}$; and $t_{end}$.

Determining whether the time variable is intermittently regular (504), and determining the time interval and relevant parameters of intermittency for the time interval (506), are described in further detail for some examples as follows. Time interval metadata determining system 22 may determine that, in an example dataset, there are three types of time variables: date, time, and timestamp. Time interval metadata determining system 22 may apply a set of rules based on the time variable in the timestamp type to determine whether the time variable is regular, as further described below with reference to FIG. 6. Time interval metadata determining system 22 may similarly apply the set of rules to the other types of time variable.

Figure 6:
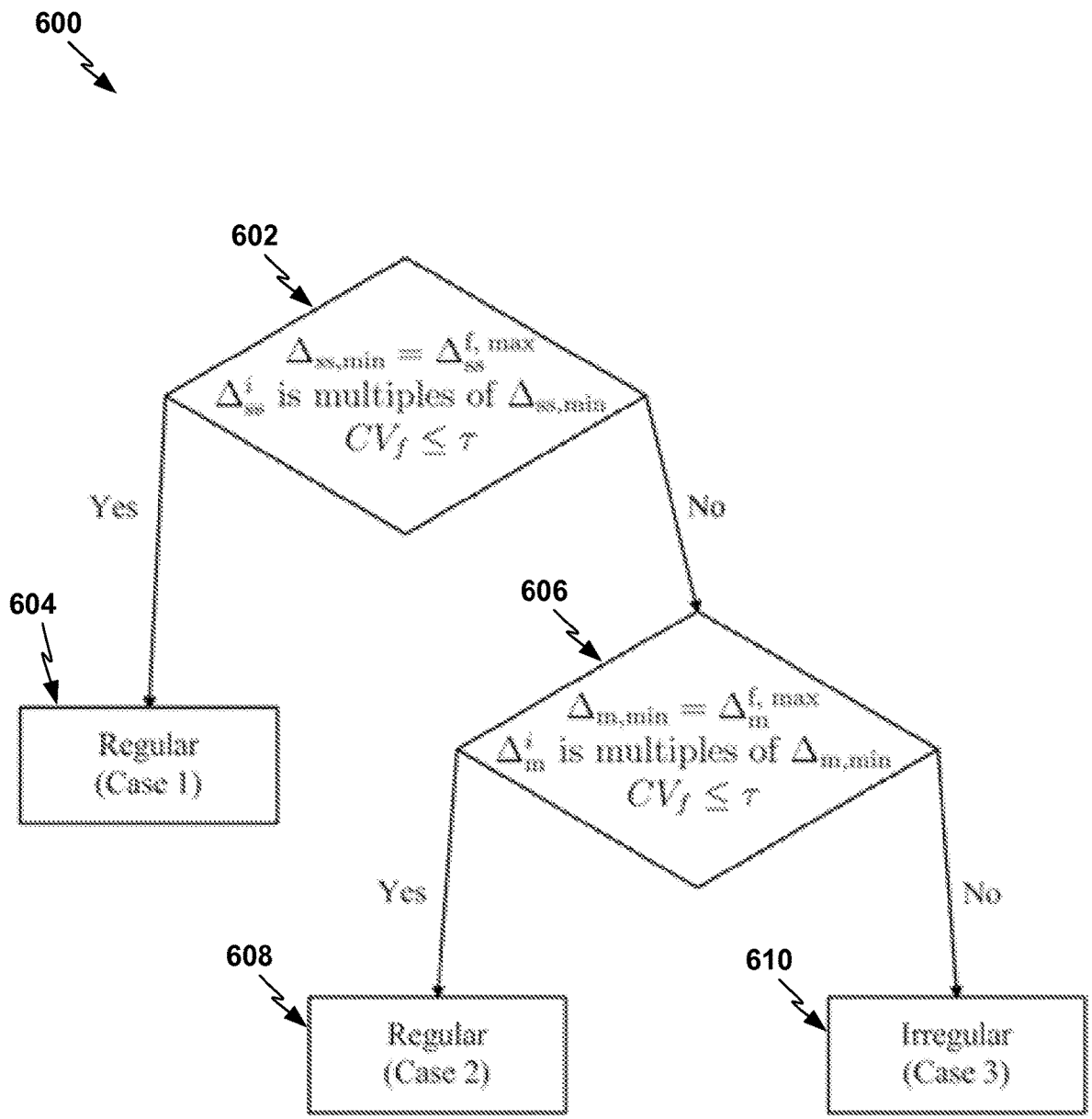
FIG. 6 shows a flowchart for a process by which a time interval metadata determining system may apply a set of rules based on the time variable in the timestamp format to determine whether the time variable is regular, in one aspect of this disclosure.

FIG. 6 shows a flowchart for a process 600 by which time interval metadata determining system 22 may apply a set of rules based on the time variable in the timestamp type to determine whether the time variable is regular, in one aspect of this disclosure. Time interval metadata determining system 22 may compute or determine the following statistics listed in Table 2 for the time variables in the data:

TABLE 2

Statistics computed for each time variable

| | |
|---|---|
| $\Delta_m^i, \Delta_{ss}^i$ | The difference in months and seconds between two connected time points ($t_{i+1}$ and $t_i$), i = 1, . . . , n − 1, respectively. |
| $\Delta_{m,min}$, $\Delta_{ss,min}$ | The minimum differences for months and seconds, respectively. i.e., $\Delta_{m,min} = \min_i \Delta_m^i$. |
| $\Delta_m^{f,max}$, $\Delta_{ss}^{f,max}$ | The differences with maximum counts in months and seconds, respectively. i.e., $\Delta_m^{f,max} = \arg\max_k f_{m,k}$ where $f_{m,k}$ denotes the frequency of $\Delta_m = k$ and k is one of possible differences of two connected time points based on the scale of the month. Similar definition are for $\Delta_{ss}^{f,max}$. |
| $CV_f$ | The coefficient of variation (CV) of $f_1, \ldots, f_n$ can be calculated by $$CV_f = \frac{s_f}{\bar{f}}$$ where $\bar{f}$ and $s_f$ denote the mean and standard deviation, respectively. |
| $\tau$ | The threshold value. The default value may be $10^{-2}$, for example. |

When the regular time variable T is in the timestamp type, its interval can be expressed using just the two time units of seconds and months, and other units of time may be simplified or collapsed into measurements of seconds or months. In particular, minutes, hours, days, and weeks can be expressed precisely in terms of seconds, while the length of each month is different so cannot be expressed in terms of the same number of seconds, in the general case. Months in turn may serve as a basis for precisely expressing quarters and years. Thus, timestamp measurements using any of the aforementioned units of time may be condensed into expressions of months and seconds.

As shown in FIG. 6, example process 600 includes rules time interval metadata determining system 22 may apply to determine the regularity of a time variable T from a dataset in terms of seconds. Process 600 includes first applying a three-part evaluation (602) in terms of seconds: (1.) determine whether the minimum difference between any two connected time points ($\Delta_{ss,min}$) equals the difference with the maximum frequency in seconds ($\Delta_{ss}^{max}$); (2.) determine whether each difference ($\Delta_{ss}^i$) is a multiple of the minimum difference ($\Delta_{ss,min}$); and (3.) determine whether the frequency of each time point should be the same or close, that is, whether the frequency variable has a small coefficient of variation, $CV_f < \tau$.

As shown in FIG. 6, if time interval metadata determining system 22 determines that the rules in terms of seconds (602) are satisfied, then time interval metadata determining system 22 determines that the time variable is regular, in terms of seconds (case 1) (604). Otherwise, time interval metadata determining system 22 may apply the rules in terms of months. Applying the rules in terms of months may be analogous to applying the rules in terms of seconds as described above (602) except that $\Delta_{ss,min}$, $\Delta_{ss}^{f,max}$ and $\Delta_{ss}^i$ may be replaced by $\Delta_{m,min}$, $\Delta_m^{f,max}$ and $\Delta_m^i$, respectively (606). If time interval metadata determining system 22 determines that the rules in terms of months are also satisfied (606), then time interval metadata determining system 22 may determine that the time variable is regular in terms of months (case 2) (608). Otherwise, if time interval metadata determining system 22 determines that the rules are not satisfied in terms of either seconds or months, time interval metadata determining system 22 may determine that the dataset is irregular (case 3) (610). Time interval metadata determining system 22 may then determine the time interval and relevant parameters of intermittency for the time variable (506 in FIG. 5), as further described below with reference to FIG. 7.

Figure 7:
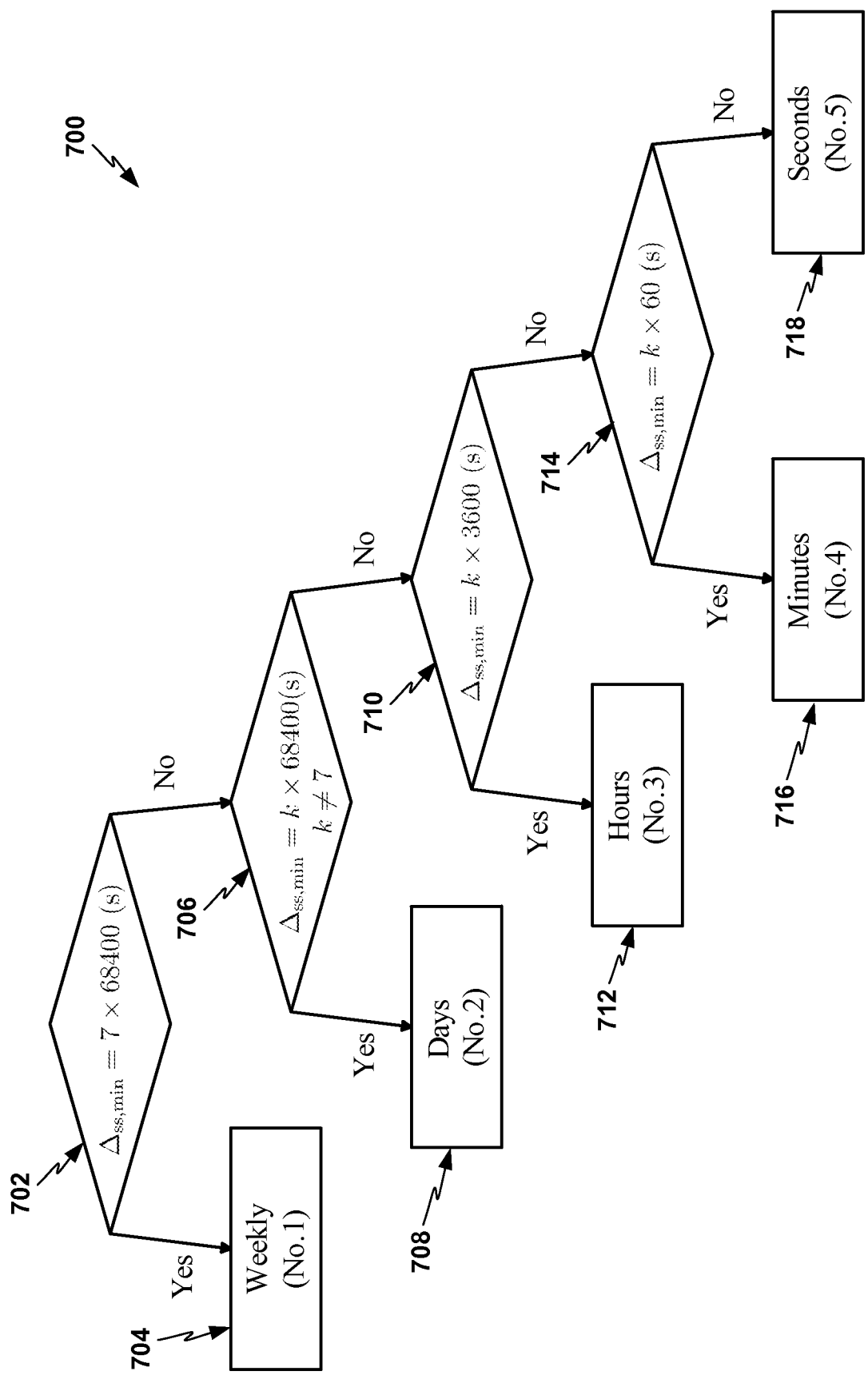
FIG. 7 shows a flowchart for a process by which a time interval metadata determining system may apply a set of rules to detect a time interval and to determine relevant parameters of intermittency for the time variable, in cases in which the time variable is regular in terms of seconds, in one aspect of this disclosure.

FIG. 7 shows a flowchart for a process 700 by which time interval metadata determining system 22 may apply a set of rules to detect a time interval and to determine relevant parameters of intermittency for the time variable, in cases in which the time variable is regular in terms of seconds (case 1) (604 in FIG. 6), in one aspect of this disclosure. When the time variable is regular (case 1 and 2), time interval metadata determining system 22 may detect the intrinsic time interval, as described above. The time interval may be years, quarters, months, weeks, days, hours, minutes, or seconds, in various examples. In addition, time interval metadata determining system 22 may detect parameters that describe how the data is distributed relative to the time interval. When the time variable is irregular (case 3), time interval metadata determining system 22 may determine the most plausible time interval and determine parameters attached to the time interval.

Time interval metadata determining system 22 may determine parameters such as a parameter of increment to describe increments in terms of the time interval. For instance, for the interval "Years", $\delta_y=2$ may denote the time span between two sequential time points is 2 years. In some examples, for "Quarterly" and "Weekly", there may be no need to define an increment parameter, because time interval metadata determining system 22 may track equivalent increment parameters in terms of months or days, respectively. In other examples, time interval metadata determining system 22 may also track increment parameters in any time increment including quarters or weeks.

TABLE 3 time interval increments for regular time variables

| No. | Time interval | Increments |
|---|---|---|
| 1 | Years | $\delta_y$ |
| 2 | Quarterly | — |
| 3 | Months | $\delta_m$ |
| 4 | Weekly | — |
| 5 | Days | $\delta_d$ |
| 6 | Hours | $\delta_{hh}$ |
| 7 | Minutes | $\delta_{mm}$ |
| 8 | Seconds | $\delta_{ss}$ |

In Case 1, there may be five possible time intervals, lower than the level of months: "Weeks", "Days", "Hours", "Minutes" and "Seconds". Time interval metadata determining system 22 may apply the set of rules in process 700 to determine which time interval is the most appropriate. In process 700, with k as a positive integer, time interval metadata determining system 22 may determine (1.) if the minimum difference $\Delta_{ss,min}$ equals 7×86400=604800 seconds (702); if so, time interval metadata determining system 22 may determine the time interval to be "Weeks" (704). Otherwise, time interval metadata determining system 22 may determine (2.) if the minimum difference $\Delta_{ss,min}$ equals k×86400, where k≠7 (706); if so, time interval metadata determining system 22 may determine the time interval to be "Days" and the increments by days $\delta_d=k$ (708).

Otherwise, time interval metadata determining system 22 may determine (3.) if $\Delta_{ss,min}$ equals k×3600 (710); if so, time interval metadata determining system 22 may determine the time interval to be "Hours" and $\delta_{hh}$=k (712). Otherwise, time interval metadata determining system 22 may determine (4.) if $\Delta_{ss,min}$ equals k×60 (714); if so, time interval metadata determining system 22 may determine the time interval to be "Minutes" and $\delta_{mm}$=k (716). Otherwise, time interval metadata determining system 22 may determine (5.) that $\Delta_{ss,min}$ is not multiples of 60, and the time interval is "Seconds" and $\delta_{ss}$=$\Delta_{ss,min}$ (718).

Figure 8:
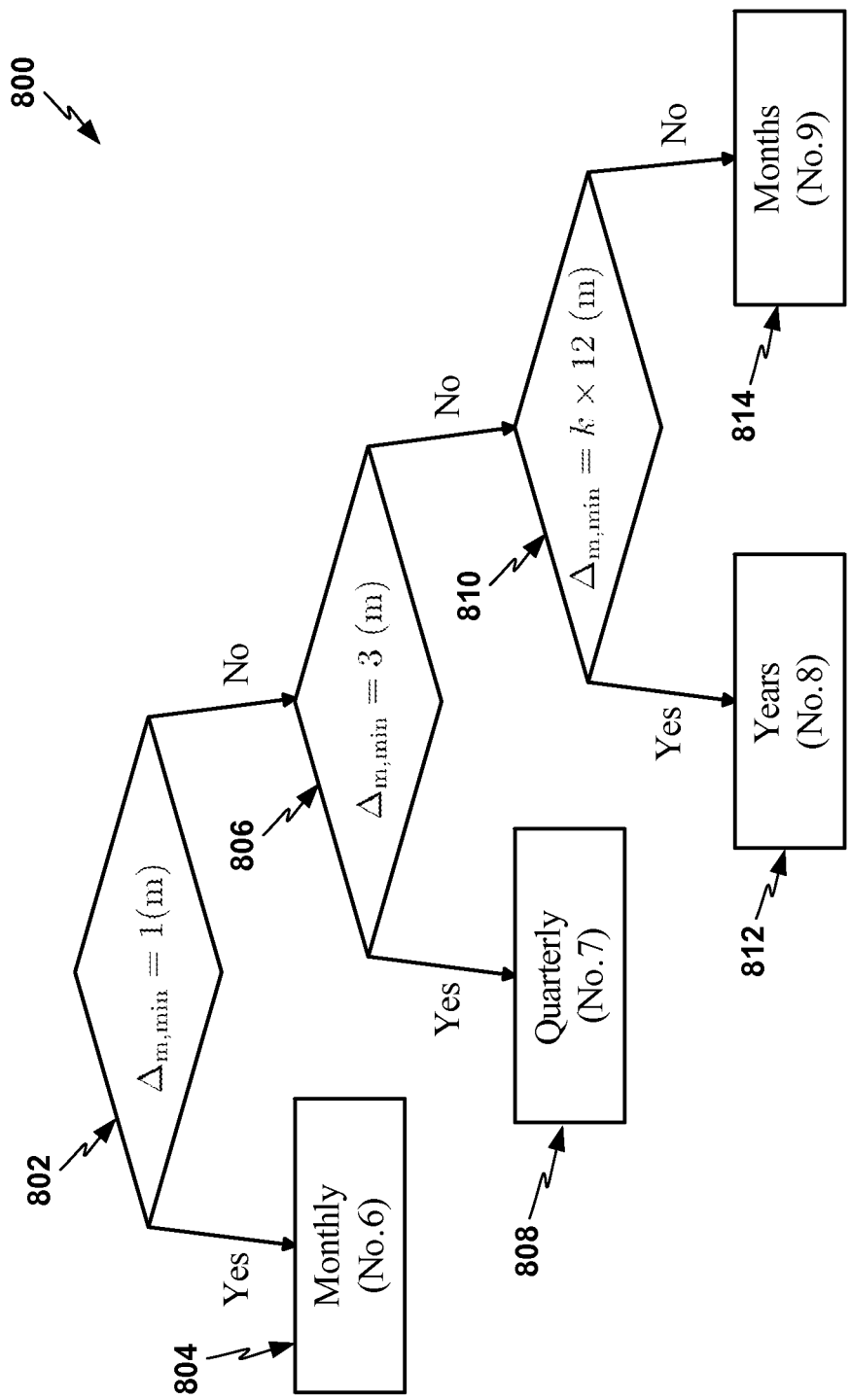
FIG. 8 shows a flowchart for a process by which a time interval metadata determining system may apply a set of rules to detect a time interval and to determine relevant parameters of intermittency for the time variable, in cases in which the possible time variable may be regular in terms of at least months, in one aspect of this disclosure.

FIG. 8 shows a flowchart for a process 800 by which time interval metadata determining system 22 may apply a set of rules to detect a time interval and to determine relevant parameters of intermittency for the time variable in cases in which the possible time variable may be regular in terms of at least "Months", and potentially also "Quarters" or "Years" (case 2) (608 in FIG. 6), in one aspect of this disclosure. Time interval metadata determining system 22 may apply the following set of rules in process 800 as shown in FIG. 8 to determine which time interval is the most appropriate. Time interval metadata determining system 22 may determine if $\Delta_{m,min}$ equals 1 (802), and if so, that the time interval is "Months" and the increments are by months, $\delta_m$=1 (804). Otherwise, time interval metadata determining system 22 may determine if $\Delta_{m,min}$ equals 3 (806), and if so, that the time interval is "Quarters" (808). Otherwise, time interval metadata determining system 22 may determine if $\Delta_{m,min}$ equals k×12, where k is a positive integer (810), if so, that the time interval is "Years", and the increments by years $\delta_y$=k (812). Otherwise, time interval metadata determining system 22 may determine if $\Delta_{m,min}$ equals any positive integer other than 1, 3 and 12 k, and if so, that the time interval is "Months" and increments by months $\delta_m$=$\Delta_{m,min}$ (814).

Time interval metadata determining system 22 may further determine the applicable parameters of intermittency for the time variable ("intermittency parameters") for the time interval (as also in 506 in FIG. 5). This may include determining the time of day each day that data collection begins for the day, the number of hours per day covered by the data, the day of the week that data collection begins for the week, and the number of days per week covered by the data. That is, determining the parameters of intermittency for the time variable may include determining a first time of day each day that data begins for the day, in the time series data set, and determining a number of hours per day covered by the time series data set, beginning at the first time of day, in the time series data set. Determining the parameters of intermittency for the time variable may also include determining a first day per week that data begins for the week, in the time series data set, and determining a number of days per week covered by the time series data set, beginning at the first day per week, in the time series data set.

For applicable data sets, time interval metadata determining system 22 may determine two intermittency parameters of the beginning of the day ($D_{start}$) and the number of hours per day ($n_h$): (1.) for the time interval "Seconds", time interval metadata determining system 22 may determine the parameters when $\Delta_{ss,min}$<60 and 60 can be divisible by $\Delta_{ss,min}$; (2.) for the time interval "Minutes", time interval metadata determining system 22 may determine the parameters when 60 can be divisible by $\Delta_{ss,min}$/60; (3.) for the time interval "Hours", time interval metadata determining system 22 may determine the parameters when 24 can be divisible by $\Delta_{ss,min}$/3600.

Time interval metadata determining system 22 may apply the following process to determine the time intermittency parameters $D_{start}$ and $n_h$: (1.) calculate the hour-of-day for $t_i$; $H_j$=HOD($t_i$), $H_j \in \{0, 1, \ldots, 23\}$, where HOD denotes the hour-of-day, and $H_0, \ldots, H_{23}$ denote $0, \ldots, 23$, respectively. Time interval metadata determining system 22 may then (2.) calculate the counts of $H_j$'s; (3.) calculate the minimum and maximum hours based on the increment by hours, $H_{min}$ and $H_{max}$, respectively; and (4.) map $H_{min}, H_{min}+\delta_{hh}, \ldots, H_{max}$ into $0, 1, \ldots, n_{tot}-1$, respectively, see Table 4, where $n_{tot}$ denotes the number of valid points.

TABLE 4

| I | 0 | 1 | 2 | ... | $n_{tot} - 1$ |
|---|---|---|---|---|---|
| H | $H_{min}$ | $H_{min} + \delta_{hh}$ | $H_{min} + 2\delta_{hh}$ | ... | $H_{max}$ |

Time interval metadata determining system 22 may then (5.) calculate or determine the counts of $I_j$'s, where $I_j \in \{0, 1, \ldots, n_{tot}-1\}$ and $I_0, \ldots, I_{n_{tot}-1}$ denote $0, \ldots, n_{tot}-1$, respectively; (6.) find the sequences with zero counts; and (7.) determine $n_h$ and $D_{start}$: (a.) if there is no such a sequence with zero counts, time interval metadata determining system 22 may set $n_h$=$n_{tot}$ and $D_{start}$=$H_{min}$; (b.) if there is only one sequence with zero counts, denoted by $I_k, \ldots, I_l$ using clockwise order, then time interval metadata determining system 22 may set:

$$n_h = \begin{cases} n_{tot} - 1 - l + k & l \geq k \\ k - l - 1 & k > l \end{cases}$$

$$D_{start} = H_{min} + I_{start}\delta_{hh}$$

where $I_{start}$+1) mod $n_{tot}$; and a mod m returns the reminder after division of a by m. (c.) if there is more than one sequence with zero counts, time interval metadata determining system 22 may find the one with maximum length, denoted by $I_k, \ldots, I_l$ using clockwise order, then determine $n_h$ and $D_{start}$ using the formula above. In addition, time interval metadata determining system 22 may show a warning message indicating, e.g., "the relevant parameters to time interval may not be accurate." Thus, determining the parameters of intermittency for the time variable may include determining a first time of day each day that data begins for the day, in the time series data set, and determining a number of hours per day covered by the time series data set, beginning at the first time of day, in the time series data set.

Time interval metadata determining system 22 may determine the intermittency parameters of the beginning of week ($W_{start}$) and the number of days per week ($n_d$) in various situations as follows. This may be applicable (1.) for the time interval "Seconds" when $\Delta_{ss,min}$<60 and 60 can be divisible by $\Delta_{ss,min}$; (2.) for the time interval "Minutes" when 60 can be divisible by $\Delta_{ss,min}$/60; (3.) for the time interval "Hours" when 24 can be divisible by $\Delta_{ss,min}$/3600; or (4.) for the time interval "Days" when $\Delta_{ss,min}$/86400=1.

To determine the parameters of the beginning of week ($W_{start}$) 1 and the number of days per week ($n_d$), time interval metadata determining system 22 may first (1.) determine the day-of-week for $t_i$, as $D_j$=DOW($t_i$), $D_j \in \{0, 1, \ldots, 6\}$, where DOW denotes the day-of-week of the timestamp given (0=Sunday, 1=Monday, ..., 6=Saturday), and $D_0, \ldots, D_6$ denote $0, \ldots, 6$, respectively. Time interval metadata determining system 22 may then (2.) determine the counts of $D_i$'s, (3.) find the sequence(s) of $D_j$'s with zero counts, and (4.) determine $n_d$ and $W_{start}$: (a.) if there is no such a sequence with zero counts, time interval metadata determining system 22 may set $n_d$=7 and $W_{start}$=0; (b.) if there is only one sequence with zero counts, denoted by $D_k, \ldots, D_l$ using clockwise order, then time interval metadata determining system 22 may set:

$$n_d = \begin{cases} 6-l+k & l \geq k \\ k-l-1 & k > l \end{cases}$$

$$W_{start} = (D_l + 1) \bmod 7;$$

(c.) if there is more than one sequence with zero counts, time interval metadata determining system 22 may determine the one with maximum length, denoted by $D_k, \ldots, D_l$ using clockwise order, then determine $n_d$ and $W_{start}$ using the formula above. In addition, time interval metadata determining system 22 may show a warning message, e.g., "The relevant parameters to time interval may not be accurate." Thus, determining the parameters of intermittency for the time variable may also include determining a first day per week that data begins for the week, in the time series data set, and determining a number of days per week covered by the time series data set, beginning at the first day per week, in the time series data set.

Time interval metadata determining system 22 may determine a time interval for irregular time variables, case 3 above (610 in FIG. 6). In these cases, where the time variable is irregular and has no intrinsic time interval, time interval metadata determining system 22 may determine a most plausible time interval. Time interval metadata determining system 22 may select the smallest candidate time interval with a density of bins that is larger than a threshold value as the suggested time interval for irregular time variable, where the density of bins denotes the ratio of non-missing bins to all bins constructed based the time interval given.

To perform a process to determine a most plausible time interval, time interval metadata determining system 22 may set $\Delta^i = t_{i+1} - t_i$, $i \in [1, n-1]$, and set $\Delta_\alpha$ as the $\alpha$-th percentile of the set $\{\Delta^i, 0 \leq i < n\}$, where $\alpha = 90$. Time interval metadata determining system 22 may first (1.) determine the set of time intervals that are equal to or larger than $\Delta_\alpha$ from the eight types of time intervals mentioned in Table 3, denoted as $\Omega_\alpha$. For "Seconds", "Minutes", "Hours", "Days", "Months", and "Years", time interval metadata determining system 22 may set their increment parameters to 1. For "Days", time interval metadata determining system 22 may set $n_d$=7 and $W_{start}$=0 (Sunday) initially. For "Seconds", "Minutes" or "Hours", time interval metadata determining system 22 may set $n_h$=24 and $D_{start}$=0 (midnight) initially.

Then, for each time interval j in $\Omega_\alpha$, time interval metadata determining system 22 may construct the bins between the beginning and ending time of the sample and assign time points to the bins. Time interval metadata determining system 22 may then determine the density of the bins as:

$$\rho_j = nn_j / NN_j$$

which may be defined as the number of non-missing bins ($nn_j$) divided by the total number of bins ($NN_j$). For applicable cases, time interval metadata determining system 22 may modify the density by subtracting invalid bins, $NN_{0,j}$, from $NN_j$:

$$\rho_j = \frac{nn_j}{NN_j - NN_{0,j}}$$

For "Days", time interval metadata determining system 22 may apply the method described above to adjust $n_d$ and $W_{start}$. Time interval metadata determining system 22 may reject bins that are outside of $[W_{start}, W_{start}+n_d]$ as invalid. For "Seconds", "Minutes" or "Hours", time interval metadata determining system 22 may apply the methods described above to adjust $n_d$, $W_{start}$, $n_h$ and $D_{start}$. Time interval metadata determining system 22 may reject bins that are outside of $[W_{start}, W_{start}+n_d]$ or $[H_{start}, D_{start}+n_h]$ as invalid. Time interval metadata determining system 22 may then identify and output the smallest time interval with a density equal to or larger than $\beta$(=90%, for example). Time interval metadata determining system 22 may output the parameters attached to the time interval, if any. Thus, determining the parameters of intermittency for the time variable may include determining that the time variable is irregular, and determining a smallest candidate time interval with a density of bins that is larger than a threshold value as the time interval for the irregular time variable. Thus, determining the parameters of intermittency for the time variable may include determining the time variable is regular with a smallest candidate time interval.

Time interval metadata determining system 22 may also determine whether the data is in a column-based format. When the time variable is regular, time interval metadata determining system 22 may determine (1.) if $f_i$=1 for all $i \in [1, n]$, and if so, then identify the data as being in column-based format. Time interval metadata determining system 22 may also then evaluate the continuous variables as metric variables, and numeric categorical variables as metric variables. In some examples, time interval metadata determining system 22 may output suggestions for user confirmation whether to accept the continuous variables as metric variables, and numeric categorical variables as metric variables. (2.) if $f_i \neq 1$ for some or all $i \in [1, n]$, time interval metadata determining system 22 may identify the data as being FMD format. Time interval metadata determining system 22 may also then evaluate the continuous variables as metric variables, and categorical variables with string storage type as dimension variables. In some examples, time interval metadata determining system 22 may set $N_d$ to be the number of category combinations of dimensional variables with the string storage type. If $\max_i f_i \leq N_d$, time interval metadata determining system 22 may determine the numerical categorical variables to be metric variables, pending user confirmation, and otherwise to determine the numerical categorical variables to be dimension variables.

When the time variable is irregular, time interval metadata determining system 22 may be unable to differentiate between column-based and general FMD format, but may provide suggestions to the user based on the metadata of variables other than the time variable. For example, if all variables are continuous, time interval metadata determining system 22 may determine, potentially pending user confirmation, that the data is in a column-based format, and the continuous variables are metric variables. If there exist categorical variables, time interval metadata determining system 22 may determine, potentially pending user confirmation, that the data is in a general FMD format, continuous variables are metric variables, and categorical variables are dimension variables.

Time interval metadata determining system 22 may determine and check the dimension variables. If the data is determined to be in FMD format rather than column-based format, time interval metadata determining system 22 may check whether dimension variables are enough to identify all time series available in the data. Dimension variables may be auto-specified based on the variables with their measurement level being categorical. Based on the number of categories of each dimension variable, time interval metadata determining system 22 may calculate the total number of combinations of categories of dimension variables ($N'_d$), where $N'_d$ may not be equal to $N_d$. When the time variable is regular, if $\max_i f_i < N'_d$, the dimension variables can identify all time series; otherwise, additional dimension variables need to be specified. Time interval metadata determining system 22 may output a warning message, such as "Current dimension variables could not identify all time series; additional dimension variables should be specified." If there are m integer continuous variables, $V_1, \ldots, V_m$, time interval metadata determining system 22 may output a further warning message such as, "The additional dimension variables may be in the set of variables $V_1, \ldots, V_m$." When the time variable is irregular, time interval metadata determining system 22 may be unable to determine whether the dimension variables can identify all time series, but may output suggestions for user confirmation, such as whether the data is in column-based or FMD format, which variables are dimension variables (if the data is in FMD format), and which variables are metric variables. Time interval metadata determining system 22 may make a confirmation or an adjustment to its determination based on user inputs responsive to the suggestion outputs.

Figure 9:
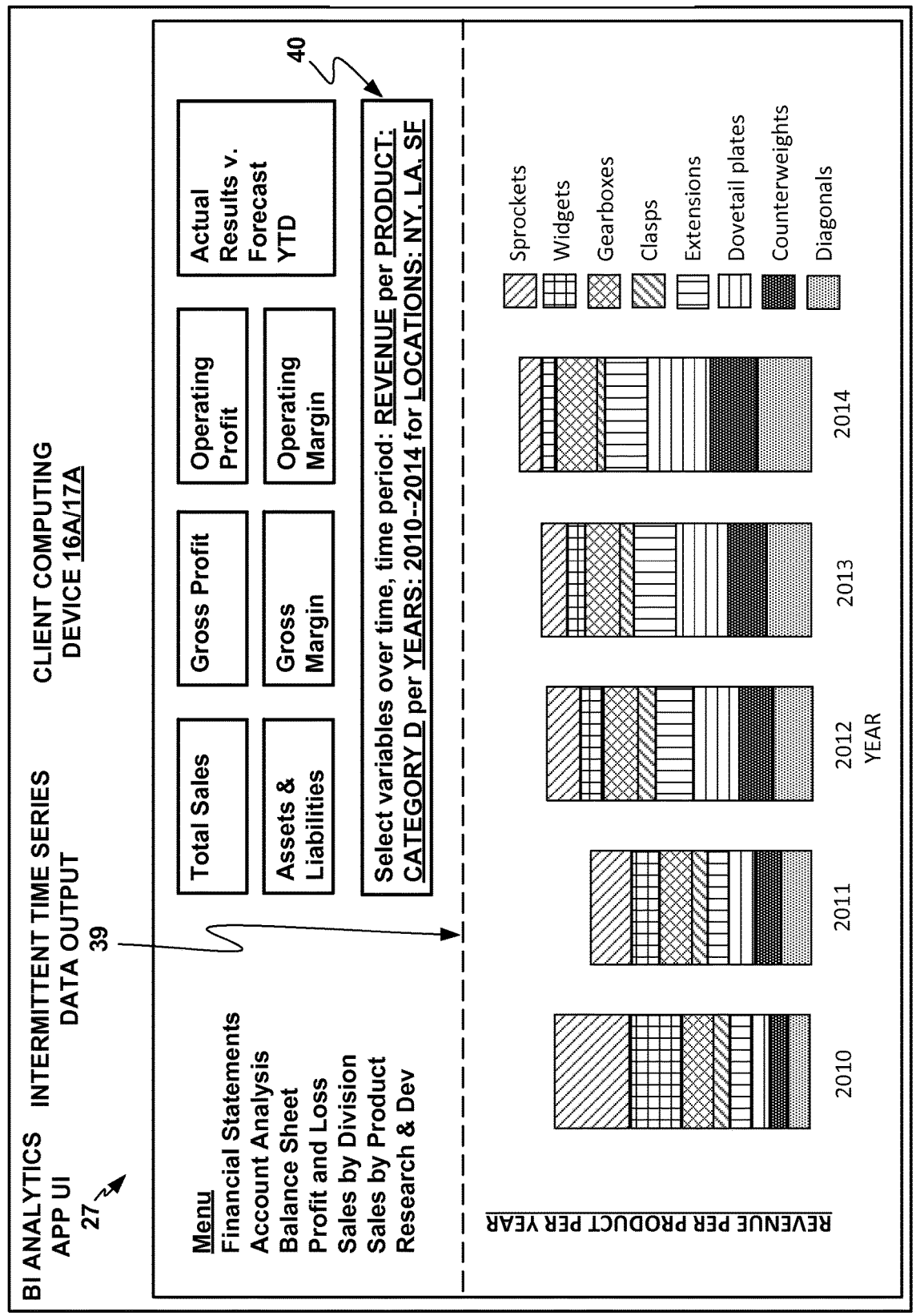
FIG. 9 shows a screenshot of an example BI analytics application user interface (UI) including an example intermittent time series data output enabled by a time interval metadata determining system to show time series data on a regular basis even though it is based on intermittent time series data, in one aspect of the disclosure.

FIG. 9 shows a screenshot of an example BI analytics application user interface (UI) 27 including an example intermittent time series data output 39 enabled by time interval metadata determining system 22 to show time series data on a regular basis even though it is based on intermittent time series data, in one aspect of the disclosure. BI analytics application UI 27 is rendered on a client computing device 16A/17A as in FIGS. 1 and 2. BI analytics application UI 27 may include example user input fields 40 enabling a user to enter inputs to specify time series data to explore, to select data of interest, such as revenue, profits, margins, or costs, for a selected product or product category, for a selected span of time for one or more selected locations, for example. Time interval metadata determining system 22 may then identify the data of interest in a BI data store, identify the data as regular time series data or as intermittent time series data, and for intermittent time series data, automatically process the data to enable display and exploration of the data using many of the same methods as if it were time series data. Thus, in the example of FIG. 9, time interval metadata determining system 22 may automatically enable intermittent time series data to be available for analytical and exploration techniques that otherwise may only operable on regular time series data. Implementations of this disclosure may thus enable a wide variety of powerful analytical and exploration techniques to be useable on a wider range of useful data applications.

Figure 10:
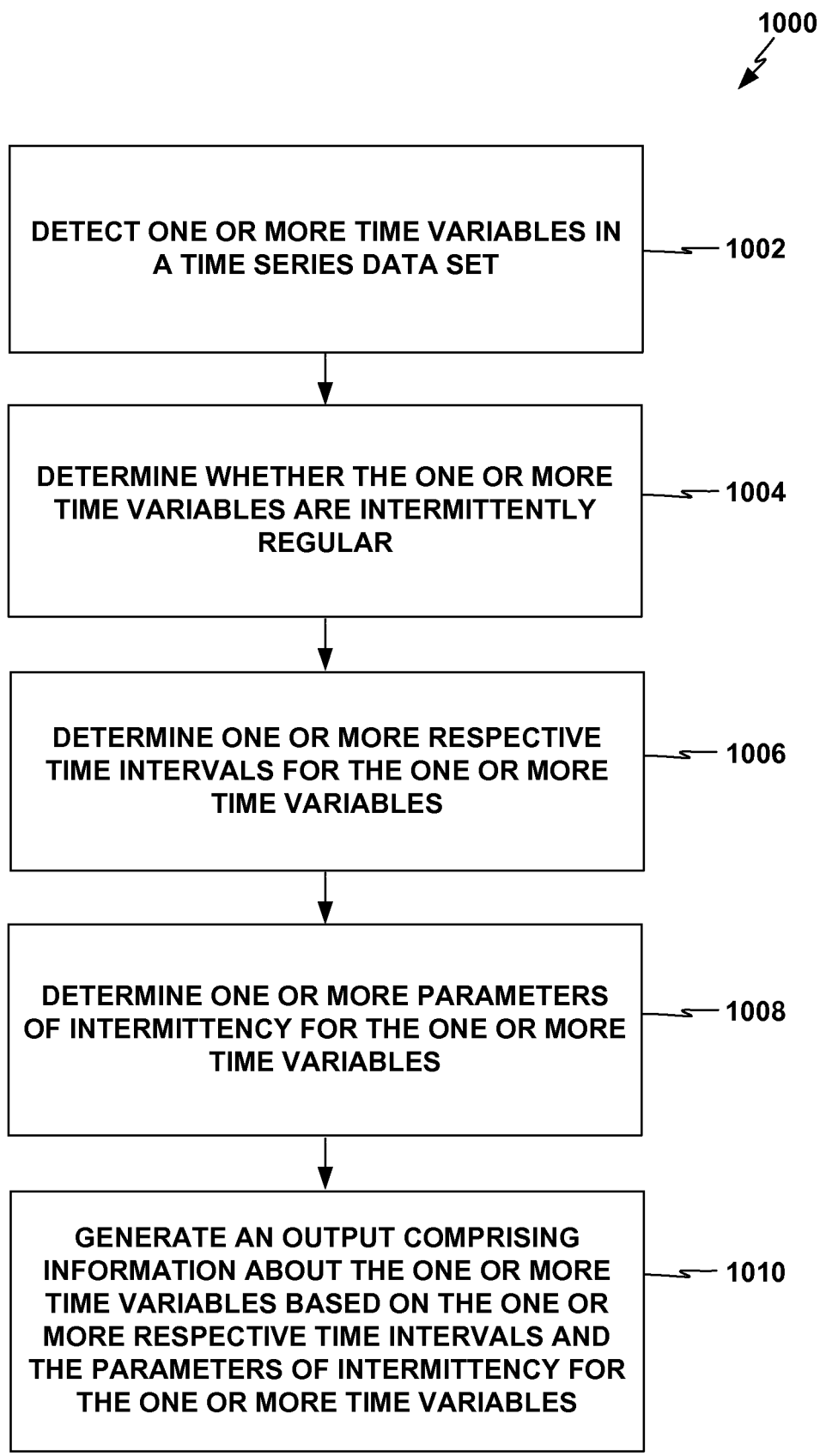
FIG. 10 depicts a flowchart of an example process for automatically determining intermittent time series metadata that a time interval metadata determining system, executing on one or more computing devices (e.g., servers, computers, processors, etc.), may perform, in one aspect of this disclosure.

FIG. 10 depicts a flowchart of an example process 1000 for automatically determining intermittent time series metadata that time interval metadata determining system 22, executing on one or more computing devices (e.g., servers, computers, processors, etc.), may perform, in one aspect of this disclosure. Process 1000 may include detecting one or more time variables in a time series data set (1002) (e.g., detecting a time variable in a time series data set (502) as described above), determining whether the one or more time variables are intermittently regular (1004) (e.g., determining whether the time variable is intermittently regular (504) as described above), determining one or more respective time intervals for the one or more time variables (1006) (e.g., determining the time interval for the time variable (506) as described above), determining one or more parameters of intermittency for the one or more time variables (1008) (e.g., determining the intermittency parameters for the time variable (506) as described above), and generating an output comprising information about the one or more time variables based on the one or more respective time intervals and the parameters of intermittency for the one or more time variables (1010) (e.g., intermittent time series data output 39 or other outputs in BI analytics application UI 27 in FIG. 9 as described above, which may be initially generated by time interval metadata determining system 22, potentially with additional output generating functions performed by time series analysis system 34 and/or characterization output system 36 of a time series data analysis system 29 as in the example shown in FIG. 4). Various implementations of process 1000 may also include any of the processes described above.

Figure 11:
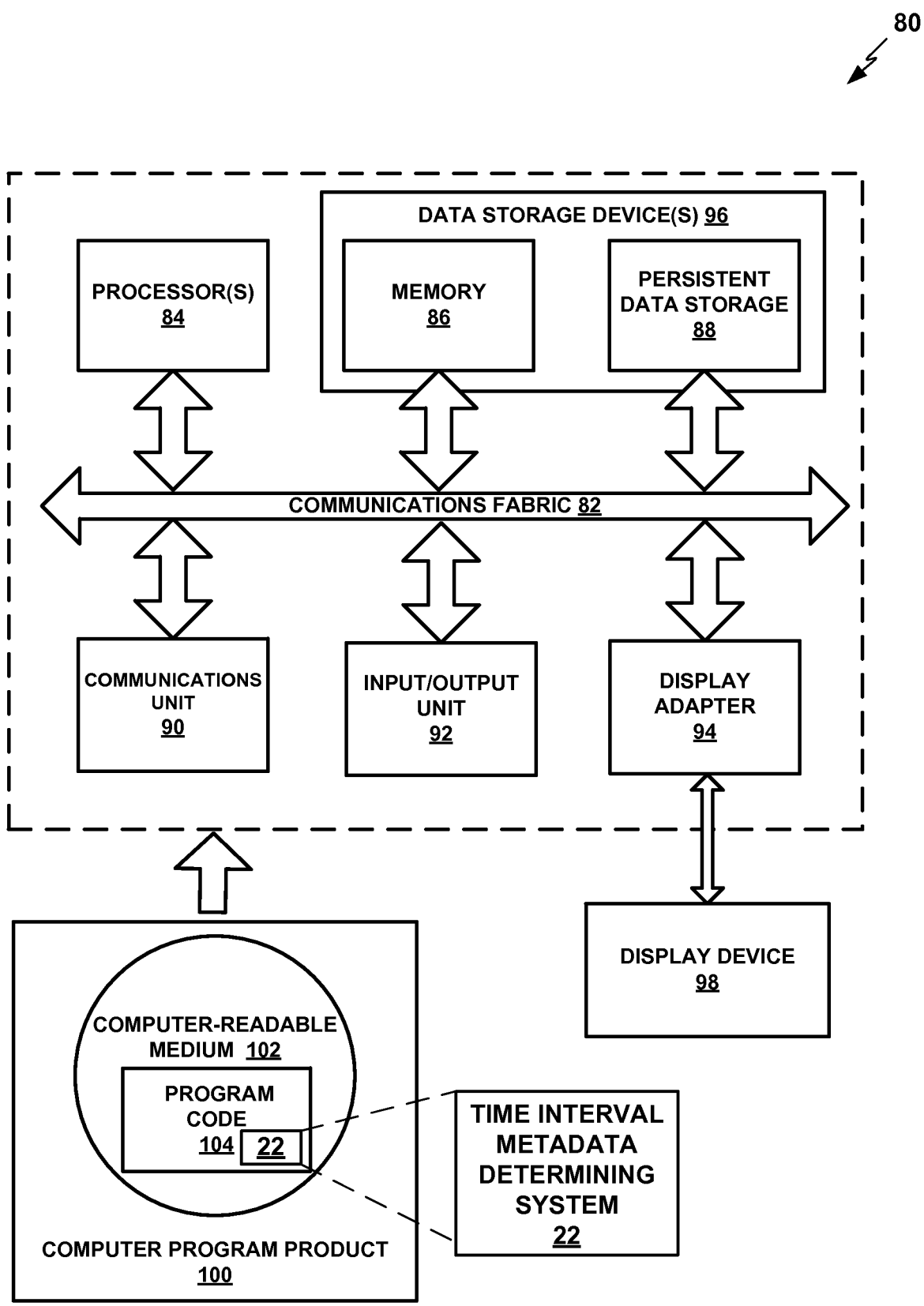
FIG. 11 is a block diagram of a computing device that may be used to execute a time interval metadata determining system, in one aspect of this disclosure.

FIG. 11 is a block diagram of a computing device 80 that may be used to execute a time interval metadata determining system 22, in one aspect of this disclosure. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 11, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a time interval metadata determining system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer-readable storage medium having program code embodied therewith, the program code executable by a computing device to:

detect one or more time variables in a time series data set;
   extract a sample of time values of a particular time variable of the one or more time variables from the time series data set;
   determine, based at least in part on the sample of time values, that the one or more time variables are intermittently regular with one or more intervals of interruption;
   determine one or more respective time intervals for the one or more time variables;
   determine parameters of intermittency for the one or more time variables, wherein the parameters characterize the one or more intervals of interruption;
   generate an output comprising information about the one or more time variables based on the one or more respective time intervals and the parameters of intermittency for the one or more time variables;
   determine, based on the output, one or more subsets of the time series data set, wherein the one or more subsets of the time series data set are each associated with a regular interval;
   perform time series modeling or analysis operations on the one or more subsets of the time series data set; and
   output at least one data visualization associated with the time series modeling or analysis operations.

2. The computer program product of claim 1, wherein the program code executable by the computing device to determine that the one or more time variables are intermittently regular is further executable by the computing device to determine whether the particular time variable of the one or more time variables is regular in terms of seconds, whether the particular time variable is regular in terms of months, or whether the particular time variable is irregular.

3. The computer program product of claim 1, wherein the program code executable by the computing device to determine the parameters of intermittency for the one or more time variables is further executable by the computing device to:

determine, for each day in the time series data set and based on the time series data set, a first time of day that data begins; and
   determine, based on the time series data set, a number of hours per day covered by the time series data set, beginning at the first time of day.

4. The computer program product of claim 1, wherein the program code executable by the computing device to determine the parameters of intermittency for the one or more time variables is further executable by the computing device to:

determine a first day per week that data begins for a week; and
   determine a number of days per week covered by the time series data set, beginning at the first day per week.

5. The computer program product of claim 1, wherein the program code executable by the computing device to determine the parameters of intermittency for the one or more time variables is further executable by the computing device to:

determine that the particular time variable of the one or more time variables is irregular; and
   determine a smallest candidate time interval with a density of bins that is larger than a threshold value as a time interval for the particular time variable.

6. The computer program product of claim 1, wherein the program code is further executable by the computing device to determine a format of the time series data set, and
   wherein the program code executable by the computing device to determine the format of the time series data set is further executable by the computing device to determine whether the format comprises a standard multi-dimensional format comprising the one or more time variables, one or more dimensions, and one or more metrics in a multi-dimensional data cube; a flattened multi-dimensional (FMD) format comprising a time variable, the one or more dimensions, and the one or more metrics in a column-based format; or a simple column-based format comprising the time variable and the one or more metrics in a column-based format.

7. The computer program product of claim 6,
wherein the format comprises the standard multi-dimensional format or the FMD format, and
wherein the program code is further executable by the computing device to identify one or more dimension variables for the time series data in the determined format.

8. The computer program product of claim 1, wherein the program code further comprises program code executable by the computing device to determine the regular interval to be a difference between two connected time points in the time series data that equals a difference with a maximum frequency in the time series data.

9. The computer program product of claim 1, wherein the program code further comprises program code executable by the computing device to:
determine that each difference in the time series data is a multiple of a minimum difference in the time series data; and
set the regular interval as the minimum difference.

10. The computer program product of claim 1, wherein the program code further comprises program code executable by the computing device to determine the regular interval based, at least in part, on a frequency variable associated with a time interval that has a small coefficient of variation.

11. The computer program product of claim 1, wherein the program code further comprises program code executable by the computing device to determine the regular interval to be a minimum time difference in the time series data that is an integer multiple of a base time unit.

12. A computer system comprising:
one or more processors, one or more computer-readable memories, and one or more computer-readable, tangible storage devices;
program instructions, stored on at least one of the one or more storage devices for execution by at least one of the one or more processors via at least one of the one or more memories, to detect one or more time variables in a time series data set;
program instructions, stored on at least one of the one or more storage devices for execution by at least one of the one or more processors via at least one of the one or more memories, to extract a sample of time values of a particular time variable of the one or more time variables from the time series data set;
program instructions, stored on at least one of the one or more storage devices for execution by at least one of the one or more processors via at least one of the one or more memories, to determine, based at least in part on the sample of time values, that the one or more time variables are intermittently regular with one or more intervals of interruption;
program instructions, stored on at least one of the one or more storage devices for execution by at least one of the one or more processors via at least one of the one or more memories, to determine one or more respective time intervals for the one or more time variables;
program instructions, stored on at least one of the one or more storage devices for execution by at least one of the one or more processors via at least one of the one or more memories, to determine parameters of intermittency for the one or more time variables, wherein the parameters characterize the one or more intervals of interruption;
program instructions, stored on at least one of the one or more storage devices for execution by at least one of the one or more processors via at least one of the one or more memories, to generate an output comprising information about the one or more time variables based on the one or more respective time intervals and the parameters of intermittency for the one or more time variables;
program instructions, stored on at least one of the one or more storage devices for execution by at least one of the one or more processors via at least one of the one or more memories, to determine, based on the output, one or more subsets of the time series data set, wherein the one or more subsets of the time series data set are each associated with a regular interval;
program instructions, stored on at least one of the one or more storage devices for execution by at least one of the one or more processors via at least one of the one or more memories, to perform time series modeling or analysis operations on the one or more subsets of the time series data set; and
program instructions, stored on at least one of the one or more storage devices for execution by at least one of the one or more processors via at least one of the one or more memories, to output at least one data visualization associated with the time series modeling or analysis operations.

13. The computer system of claim 12, wherein the program instructions to determine that the one or more time variables are intermittently regular comprise program instructions to determine whether the particular time variable of the one or more time variables is regular in terms of seconds, whether the particular time variable is regular in terms of months, or whether the particular time variable is irregular.

14. The computer system of claim 12, wherein the program instructions to determine the parameters of intermittency for the one or more time variables comprise program instructions to:
determine, for each day in the time series data set and based on the time series data set, a first time of day that data begins; and
determine, based on the time series data set, a number of hours per day covered by the time series data set, beginning at the first time of day.

15. The computer system of claim 12, wherein the program instructions to determine the parameters of intermittency for the one or more time variables comprise program instructions to:
determine a first day per week that data begins for a week; and
determine a number of days per week covered by the time series data set, beginning at the first day per week.

16. The computer system of claim 12, wherein the program instructions further comprise program instructions to determine the regular interval to be a difference between two connected time points in the time series data that equals a difference with a maximum frequency in the time series data.

17. The computer system of claim 12, wherein the program instructions further comprise program instructions to:
determine that each difference in the time series data is a multiple of a minimum difference in the time series data; and
set the regular interval as the minimum difference.

18. The computer system of claim 12, wherein the program instructions further comprise program instructions to determine the regular interval to be a frequency variable associated with a time interval that has a small coefficient of variation.

19. The computer system of claim 12, wherein the program instructions further comprise program instructions to determine the regular interval to be a minimum time difference in the time series data that is an integer multiple of a base time unit.

\* \* \* \* \*